C. W. SALADEE.
Running Gear for Vehicles.
No. 9,729. Reissued May 31, 1881.
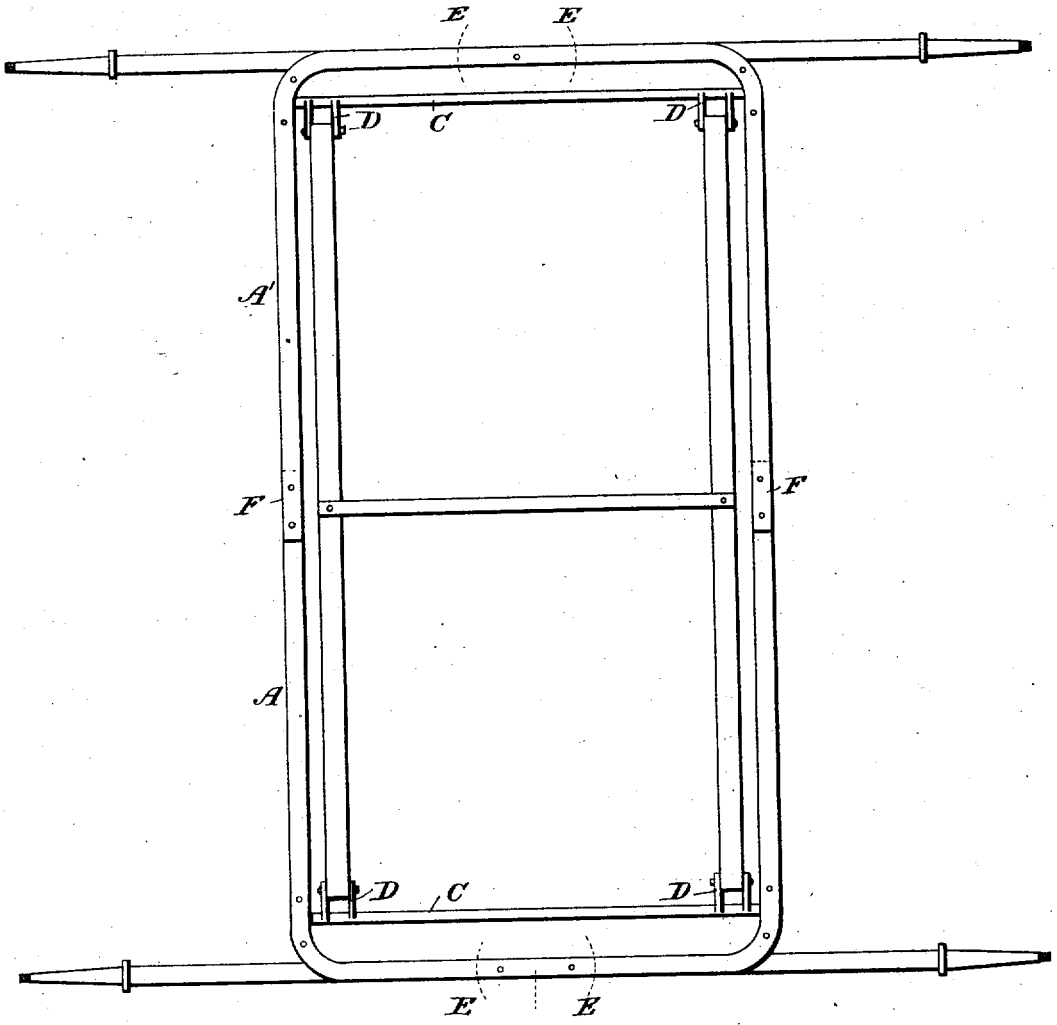
Attest:
A. Hansmann.
William Paxton
Cyrus W. Saladee
By his attorney
Charles E. Foster
N. PETERS, Photo-Lithographer, Washington, D. C.

UNITED STATES PATENT OFFICE.

CYRUS W. SALADEE, OF WOLCOTTVILLE, CONNECTICUT.

RUNNING-GEAR FOR VEHICLES.

SPECIFICATION forming part of Reissued Letters Patent No. 9,729, dated May 31, 1881.

Original No. 148,497, dated March 10, 1874. Application for reissue filed February 28, 1881.

*To all whom it may concern:*

Be it known that I, CYRUS W. SALADEE, of Wolcottville, in the county of Litchfield and State of Connecticut, have invented an Improvement in Running-Gear for Vehicles, of which the following is a specification.

My invention relates to that class of road-wagons in which the front and rear bolsters or axles are connected by side bars or perches, and in which the body is hung upon semi-elliptic springs; and the object of my invention is to hang the body low down and close to the side bars, without being liable to strike the latter. This object is secured by arranging the side springs inside the side bars or perches instead of outside, as heretofore, and by connecting their adjacent ends to an equalizing device arranged to operate between said bars, as fully described hereinafter.

The frame connecting the axles is made of one or more strips or pieces, as shown in the accompanying drawing, which is a plan of sufficient of a road-wagon to illustrate my invention. It consists of two pieces A, A′, each sufficient to form one bolster and the half of each perch, and bent to the U shape shown, the ends of the two bent pieces being then spliced at F F. The frame thus formed has no jointed corners, and constitutes an endless perch of great strength.

Heretofore, in hanging the bodies between side bars or perches, it has been necessary, to prevent the body from tilting and striking said bars, to arrange the latter at such a distance from the body that they limit the movement of the wheels in turning, so that a "short turn" cannot be made. I obviate this by hanging the springs inside the perches, and by so equalizing the action of the springs that the body is prevented from tilting laterally, permitting the perches to be arranged much closer to the body than heretofore. To secure this action I unite the adjacent ends of the side springs, arranged between the perches, to ears D of an equalizing-bar, C, turning in suitable bearings, so that any excess of weight upon one spring turning the bar C also lowers the other spring to an equal extent, and preserves the body horizontal, so that it will not strike the side perches.

The arrangement of equalizing-bars in combination with both ends of the springs, as shown, secures a like effect at each end of the spring-platform. Another result of this arrangement is the suspending of the body lower down than is possible when the springs are outside of the perches, which would be struck by the body if it were not raised well up above them.

I am aware that equalizing-bars have been used in connection with bodies hung to springs outside the perches; but in such cases the result which I effect is not attained, which is the perfect support of the body, while allowing all desirable vertical movement without unduly spreading the springs apart.

I claim—

1. In a road-wagon, the combination, as set forth, of a body, side perches, semi-elliptic springs arranged between the perches, and means for equalizing the action of such springs, as set forth.

2. The combination, with the semi-elliptic springs supporting a body between the side bars or perches of a vehicle, of an equalizing-bar arranged opposite and connected to the adjacent ends of said springs, substantially as set forth.

In testimony whereof I have signed my name to this specification in the presence of two subscribing witnesses.

CYRUS WELLINGTON SALADEE.

Witnesses:

JOSEPH E. ALLEN,

C. L. MCNEIL.